(12) United States Patent  
Satake et al.

(10) Patent No.: US 7,246,241 B2
(45) Date of Patent: Jul. 17, 2007

(54) APPARATUS AND METHOD FOR SECURELY REALIZING COOPERATIVE PROCESSING

(75) Inventors: Masanori Satake, Ebina (JP); Takanori Masui, Ebina (JP); Tatsuhiko Yokohama, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 629 days.

(21) Appl. No.: 10/653,191

(22) Filed: Sep. 3, 2003

(65) Prior Publication Data

US 2004/0193889 A1 Sep. 30, 2004

(30) Foreign Application Priority Data

Mar. 25, 2003 (JP) ............................. 2003-082612

(51) Int. Cl.
H04L 9/00 (2006.01)
(52) U.S. Cl. .................... 713/176; 713/156; 713/181
(58) Field of Classification Search ............. 713/160, 713/161, 176, 156, 181
See application file for complete search history.

(56) References Cited

U.S. PATENT DOCUMENTS

| 6,157,721 A * | 12/2000 | Shear et al. ............. 380/255 |
| 6,772,341 B1 * | 8/2004 | Shrader et al. ........... 713/175 |
| 2002/0138577 A1 * | 9/2002 | Teng et al. ............... 709/205 |

FOREIGN PATENT DOCUMENTS

| JP | A 8-123744 | 5/1996 |
| JP | A 2001-282970 | 10/2001 |
| JP | A 2002-99686 | 4/2002 |
| JP | A 2002-164884 | 6/2002 |

OTHER PUBLICATIONS

Kaliski B., PKCS #7: Cryptographic Message Syntax Version 1.5, Mar. 1998, Network Working Group, Request for Comments: 2315.*

* cited by examiner

*Primary Examiner*—Nasser Moazzami
*Assistant Examiner*—Carlton Johnson
(74) *Attorney, Agent, or Firm*—Oliff & Berridge, PLC

(57) ABSTRACT

A device for facilitating verification of an electronic signature in an exchange of instructions between an in-house server and an outside server. Each server which is to execute a partial process of a cooperative service has, in a key storage unit (206), secret keys corresponding to public key certificates issued by an in-house CA and by an outside public CA. A signature key selection unit 216 judges whether a server which is to execute a process next is a device within or outside the company and selects an in-house secret key when the next server is an in-house device and an outside secret key when the next server is an outside device. A signature creation unit (218) calculates a value of an electronic signature for an job flow instruction to the next server using the selected secret key. An instruction division/integration unit (204) transmits to the next server the job flow instruction with the electronic signature value attached.

6 Claims, 7 Drawing Sheets

APPARATUS AND METHOD FOR SECURELY REALIZING COOPERATIVE PROCESSING

BACKGROUND OF THE INVENTION

1. Field of the Invention

The present invention relates to a technology for realizing cooperative processing wherein processors present on a network cooperate, and in particular to a security technology associated with cooperative processing.

2. Description of the Related Art

Workflow systems are currently being proposed in which various services can be provided for office functions by connecting to a LAN (Local Area Network) devices such as a scanner, a facsimile machine, a printer, a copier, and a multifunction device having these functions integrated so that these devices can communication with information processors such as personal computers or a mail server.

In recent years, technologies allowing various web applications to cooperate with one other have been proposed. It is highly expected that, if an overall system can be constructed by connecting various application services and service providers accessible through the Internet and provided, the cost for developing a system can be significantly reduced because existing services can be utilized. In connection with this, languages such as XML (extensible Markup Language) or the like also are attracting attention as a common platform enabling such cooperative services.

Examples of conventional workflow systems include those disclosed in, for example, Japanese Patent Laid-Open Publications Nos. Hei 8-123744, 2002-99686, and 2001-282970.

In a workflow system, a request for a service in each of processors forming the flow is made by sequentially transmitting instruction data from one processor to another. Where there is a risk of falsification or "spoofing", there may arise cases wherein the level of security cannot be maintained at a level required by the processor.

This problem becomes particularly significant when a processor located outside of an internal network(such as intranet) is to be incorporated into the workflow. Examples of an external processor incorporated into the workflow include various processors such as, for example, a time stamp server for providing a presence authentication of data as a third party agent and an accounting server (for example, a settlement processor of a credit card company) for collecting money on behalf of a service provider.

In order to prevent such falsification of data or spoofing, an electronic signature system such as PKI (Public Key Infrastructure) is used. Such an electronic signature system can be used for communication of instruction data between processors.

However, in the case when data is transmitted between a processor located inside an internal network and another processor located outside that network, verification of the electronic signature becomes difficult. This is due to the following reasons.

Certificate authorities ("CA") in general include certificate authorities of various levels, and range from those that with a high level of public trust, such as those provided by national governments or recognized corporations such as the Verisign Corporation, to those especially built within a company or a division of a company. When a workflow combining processors within the intranet of a company and processors present on the Internet is to be performed, it is likely that the CAs issuing public key certificates to the processors differ from each other. In order to address this issue, the CA publicizes the public key certificate of each user (in PKI, each processor is also a user) through a web server or an LDAP (Lightweight Directory Access Protocol) server so that a party who wishes to verify an electronic signature obtains the public key certificate necessary for the verification from these servers. When instruction data electronically signed by a processor within a company (within an intranet) using a secret key of the public key certificate of a in-house CA is transmitted to a processor outside the company (outside the intranet), the external processor may sometimes be blocked by a firewall and be unable to obtain the public key certificate from the in-house CA.

If, on the other hand, the system is configured such that a processor outside the company can obtain the public key certificate issued by the in-house CA, a problem remains that the public key certificate issued by the in-house CA commonly includes information such as the name of the owner of the certificate and their job location. If this information is transmitted outside the company, the organization within the company may be made known.

In connection with these problems, Japanese Patent Laid-Open Publication No. 2002-164884 discloses a signature proxy server used for providing electronic signature when documents are exchanged between devices within different intranets. On behalf of a device within the intranet, the signature proxy server provides an electronic signature on a document originating from a device within the intranet and verifies the electronic signature on a document from outside to a device within the intranet.

Japanese Patent Laid-Open Publication No. 2002-164884 does not, however, consider electronically signed documents within the intranet. In other words, in the configuration disclosed in this reference, a device within the intranet does not attach an electronic signature to the data originating from the device and the signature proxy server attaches an electronic signature to the data to be transmitted from a device within the intranet to the outside without verifying the authenticity of the data.

SUMMARY OF THE INVENTION

According to one aspect of the present invention, there is provided an information processor for transmitting, to a job processor, instruction data having a process description for instructing a job process or data to be processed in a job process to instruct execution of the job process, the information processor comprising a selection unit for selecting one of a first signature key certified by a first certificate authority and a second signature key certified by a second certificate authority for signing instruction data or data to be processed; a signing unit for signing the instruction data or the data to be processed using the signature key selected by the selection unit; and transmitting unit for transmitting, to the job processor, the instruction data or the data to be processed signed by the signing unit.

According to another aspect of the present invention, there is provided a job processor comprising a key storage unit having separate signature keys, one for the inside of a network to which the job processor belongs and the other for the outside of the network; a receiver unit for receiving job flow instruction data which indicates process instruction to each of the job processors and the next job processor of each of the job processors; a signature verification unit for verifying an electronic signature attached to the job flow instruction data received at the receiver unit; a processor unit for identifying, from the job flow instruction data, a process instruction the job processor should execute when the verification by the signature verification unit is successful and for executing the process according to the process instruction; an instruction data creation unit for creating output job flow instruction data to be transmitted to a next job processor based on the received job flow instruction data when the process is executed by the processor unit; a judging unit for judging whether or not the next job processor is a device within the network; a signature processor unit for electronically signing the output job flow instruction data using the signature key for the inside when the next job processor is a device within the network and using the signature key for the outside otherwise; and a transmitter unit for transmitting the output job flow instruction data electronically signed by the signature processor unit to the next job processor.

According to another aspect of the present invention, there is provided an instruction data creating device for creating job flow instruction data which indicates a process instruction for each job processor and a next job processor for each job processor for a system for realizing a service by sequentially sending the job flow instruction data among the job processors and each job processor sequentially executing the process instruction for the job processor, the device comprising a key storage unit having a signature key for inside the network to which the instruction data creating device belongs and a signature key for outside the network; a judgment unit for judging whether or not there is a job processor outside the network in the group of job processors for the service; a signature processor unit for electronically signing the job flow instruction data using the signature for the outside when the judgment unit judges that there is a device which is outside the network in the group of job processors for the service and using the signature for the inside otherwise; and a transmitter unit for transmitting the job flow instruction data electronically signed by the signature processor unit to a first job processor among the group of job processors for the service.

According to still another aspect of the present invention, there is provided a proxy device provided between an internal network and an external network, for intermediating exchange of documents between a device on the internal network and a device on the external network, the proxy device comprising a first signature verification unit for verifying an electronic signature attached to a document transmitted from the device on the internal network to the device on the external network; and a first signature conversion unit for, when it is determined in the verification by the first verification unit that the electronic signature attached to the document is signed using a signature key for the internal network, deleting the electronic signature from the document, re-attaching an electronic signature to the document using a signature key of the proxy device for the external network, and transmitting the electronically signed document to the device on the external network.

According to still another aspect of the present invention, there is provided a proxy device provided between an internal network and an external network for intermediating exchange of documents between a device on the internal network and a device on the external network, the proxy device comprising a signature verification unit for verifying an electronic signature attached to a document transmitted from a device on the external network to a device on the internal network; and a signature conversion unit for deleting, when verification by the signature verification unit is successful, the electronic signature from the document, re-attaching an electronic signature to the document using a signature key of the proxy device for the internal network, and transmitting the document to the device on the internal network.

DESCRIPTION OF PREFERRED EMBODIMENTS

Figure 1:
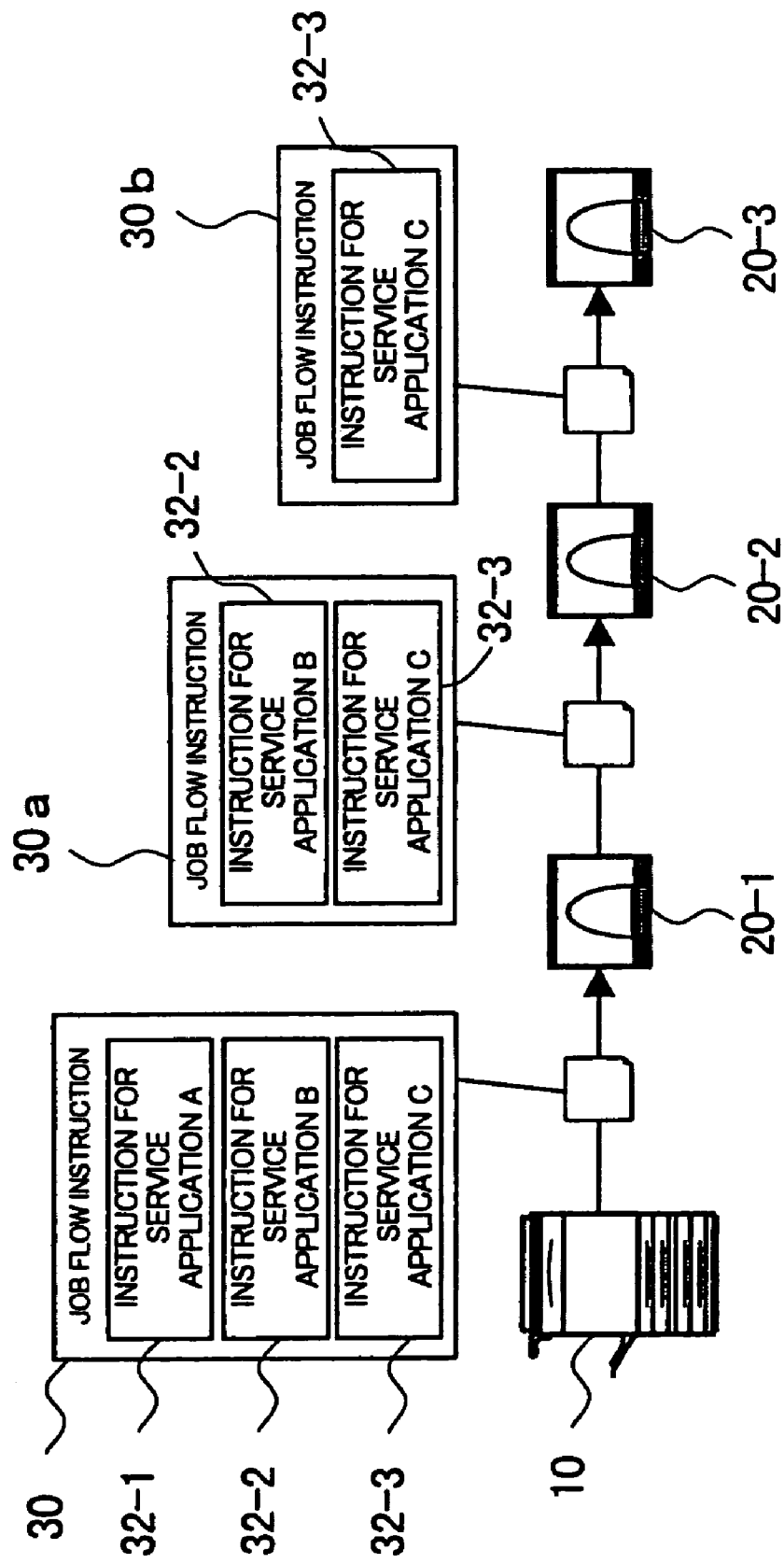
FIG. 1 is an explanatory diagram showing an example of a system configuration for realizing a cooperative service.

Preferred embodiments of the present invention will now be described referring to the drawings.

Referring to FIG. 1, an example system configuration of a service providing system to which the present invention can be applied will be described.

The illustrated system comprises an instruction input device 10 and a plurality of application servers 20.

An application server 20 is a server which provides a predetermined processing service in response to a request from another device. Examples of such a server 20 includes, for example, a document database server, a mail server, and an image processing server for applying processes such as color conversion and rotation to image data. The server 20 provides these processing services in the form of, for example, a web application service.

The instruction input device 10 is a device for inputting a user's processing instruction to the system. A user can input, into the instruction input device 10, an execution instruction of cooperative services as described above. The instruction input device 10 can be constructed by, for example, incorporating into a personal computer a user interface program for receiving input instructions from the user. It is, however, preferable that, in consideration of document processing services in offices, a digital multifunction device which includes a function to read a paper document and convert the paper document into electronic data, in addition to information processing and communication functions, be used as the instruction input device 10. A digital multifunction device is a device which has functions of a scanner, printer, copier, facsimile transmission/reception, network communication, and so on.

In this system, a user inputs an execution instruction of a desired cooperative service to the instruction input device 10. In response to the input instruction, the instruction input device 10 creates instruction data indicating the content of the cooperative service (this data will hereinafter referred to as a "job flow instruction").

The job flow instruction 30 contains a description of the process each of the servers 20 is to execute for the cooperative service (this description is hereinafter referred to as an "individual instruction") and information on the order of execution of the processes. A specific structure of such a job flow instruction may be, for example, a structure in which individual server instructions 32-1, 32-2, and 32-3 are arranged according to the order of execution of the processes of the cooperative service. The individual instruction 32 for each server 20 includes description of the name of the server 20 (this name is hereinafter referred to as a "service name") or the like so that each server 20 can identify the individual instruction 32 within the job flow instruction 30 which is directed to the server 20. The service name is written in the form of, for example, a URL (Universal Resource Locator) or a URI (Uniform Resource Identifier). In this configuration, because the individual instructions 32 are arranged in the order of the processes, each server 20 can identify the server 20 which will perform the next process from the description of the service name of the individual instruction 32 following the individual instruction 32 directed to the server 20. It is also possible to alternatively or additionally include a description of the next server 20 to perform a process (that is, the server to which the job flow instruction should be next transmitted) in the individual instruction 32. In this manner, each server 20 can identify a description of the process directed to the server 20 from the job flow instruction 30, execute a process according to the process description, and send the job flow instruction 30 to the next server 20 after completion of the process being performed.

In the example configuration of FIG. 1, a cooperative service process starts when the job flow instruction 30 as described above is transmitted from the instruction input device 10 to a first server 20-1 of the cooperative service. Upon receipt of the job flow instruction 30, the server 20-1 identifies the individual instruction 32-1 directed to the server 20-1 from the job flow instruction 30 and executes a process accordingly. The server 20-1 then deletes the individual instruction 32-1 directed to the server 20-1 from the job flow instruction 30 to create a new job flow instruction 30a and transmits the new flow instruction 30a to the next server 20-2 in the job flow. Upon receipt of the job flow instruction 30a, the server 20-2 operates in a manner similar to that of the server 20-1, deletes the individual instruction 32-2 directed to the server 20-2 from the job flow instruction 30a to create a new job flow instruction 30b, and transmits the job flow instruction 30b to a next server 20-3.

In such a system, an electronic signature system is employed as a mechanism to allow verification, by each server 20, of authenticity (i.e. the data is not falsified, etc.) of the job flow instructions 30, 30a, 30b, . . . (hereinafter referred collectively as "job flow instruction 30") received by the server 20. More specifically, when the instruction input device 10 or the server 20 is to transmit the job flow instruction 30, an electronic signature of the instruction input device 10 or of the server 20 is attached to the job flow instruction 30 and the server 20 receiving the job flow instruction 30 verifies the signature to judge the authenticity of the received job flow instruction 30.

In such a system, when, for example, the server 20-1 and the 20-3 are located within the same company as the instruction input device 10 (that is, on the intranet of this company) and the server 20-2 is located outside the company (outside the intranet), if the job flow instruction 30a sent from the server 20-1 to the server 20-2 is signed using a secret key corresponding to a public key certificate issued by a certificate authority (CA) within the company to which the server 20-1 belongs, there may be problems such as that the outside server 20-2 cannot obtain, from the CA within the company, the public key certificate necessary for the verification of the signature, as already described above.

According to the present embodiment, public key certificates from a CA within the company (or division) to which the server 20 belongs (this CA is referred to as "in-house CA" hereinafter) and from a CA of a public organization such as a government or an entity such as Verisign Corporation (this CA is referred to as "public CA" hereinafter) are provided to each server 20 (the key pairs corresponding to the certificates need not be the same for the in-house CA and for the public CA). When a server 20 electronically signs the job flow instruction 30 to be transmitted to the next server 20, the server 20 judges whether the next server 20 is within or outside of the company, and electronically signs the job flow instruction 30 using a secret key corresponding to the public key certificate of the in-house CA when the next server 20 is within the company and electronically signs the job flow instruction 30 using the secret key corresponding to the public key certificate of the public CA when the next server 20 is located outside the company. In other words, in this example configuration, each server 20 can attach two types of electronic signatures, one for in-house use and the other for external use, and selectively employ either of the two types of electronic signatures based on whether the destination device of the job flow instruction is within or outside the company.

Here, the in-house CA authenticates a public key of only particular users belonging to the company or the division (here, "user" includes not only an individual, but also a group of people or a device), whereas the public CA authenticates public keys of many unspecified users.

Figure 2:
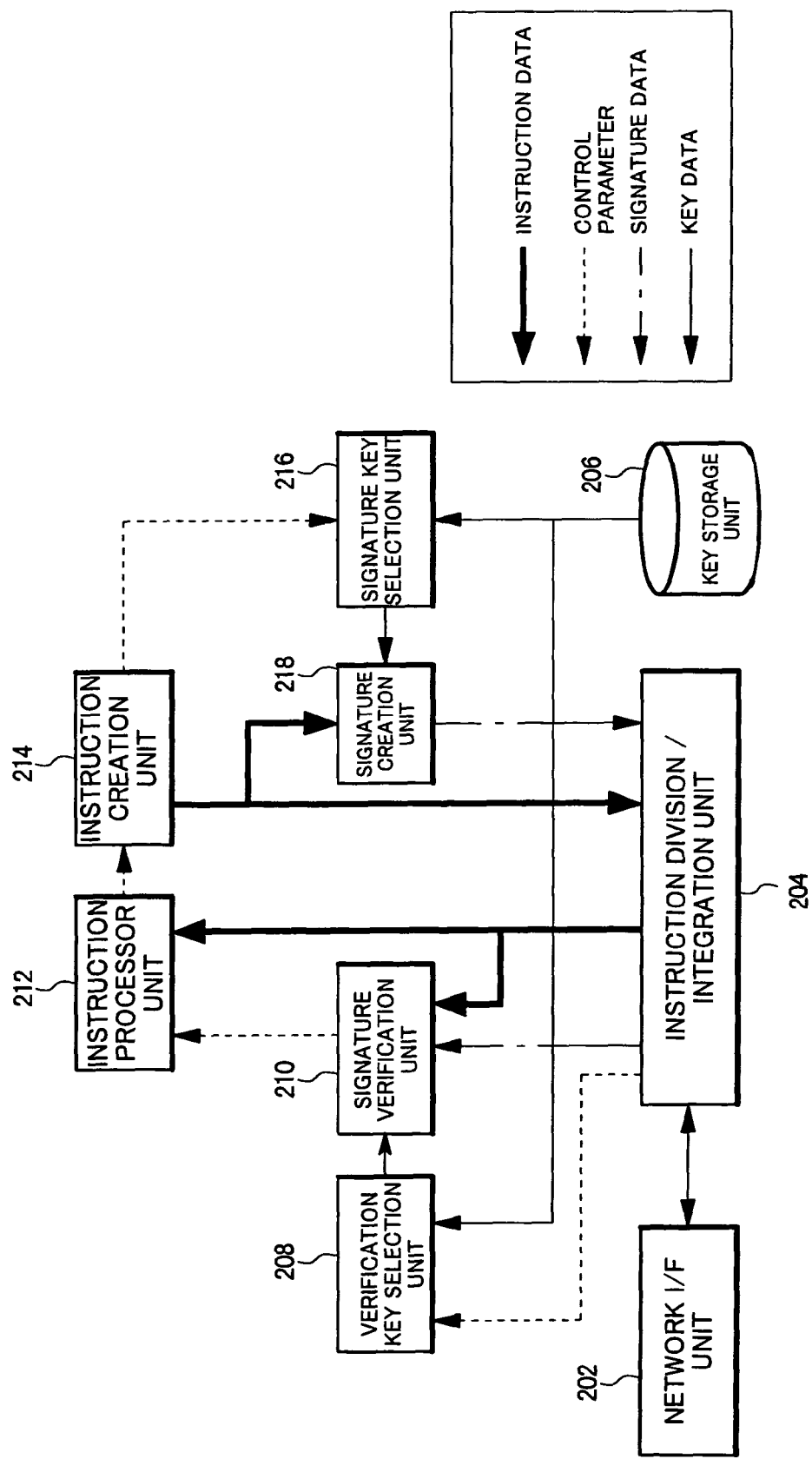
FIG. 2 is an explanatory diagram showing a structure of an application server in a system of FIG. 1.

FIG. 2 is a functional block diagram of a server 20 in this system. FIG. 2 primarily shows portions of the functions of the server 20 related to the electronic signature. The server 20 may contain other functions.

In FIG. 2, a network I/F (interface) unit 202 is a unit for controlling data communication between the server 20 and the local area network.

An instruction division/integration unit 204 is a unit for dividing a job flow instruction 30 received from a previous server 20 through the network I/F 202 and for assembling a job flow instruction 30 to be transmitted to a next server 20. In the division of the received job flow instruction 30, in effect, the job flow instruction 30 is divided into a portion describing the content of the process and a portion describing the electronic signature. This process will now be described using a specific example job flow instruction as shown in FIG. 3.

Figure 3:
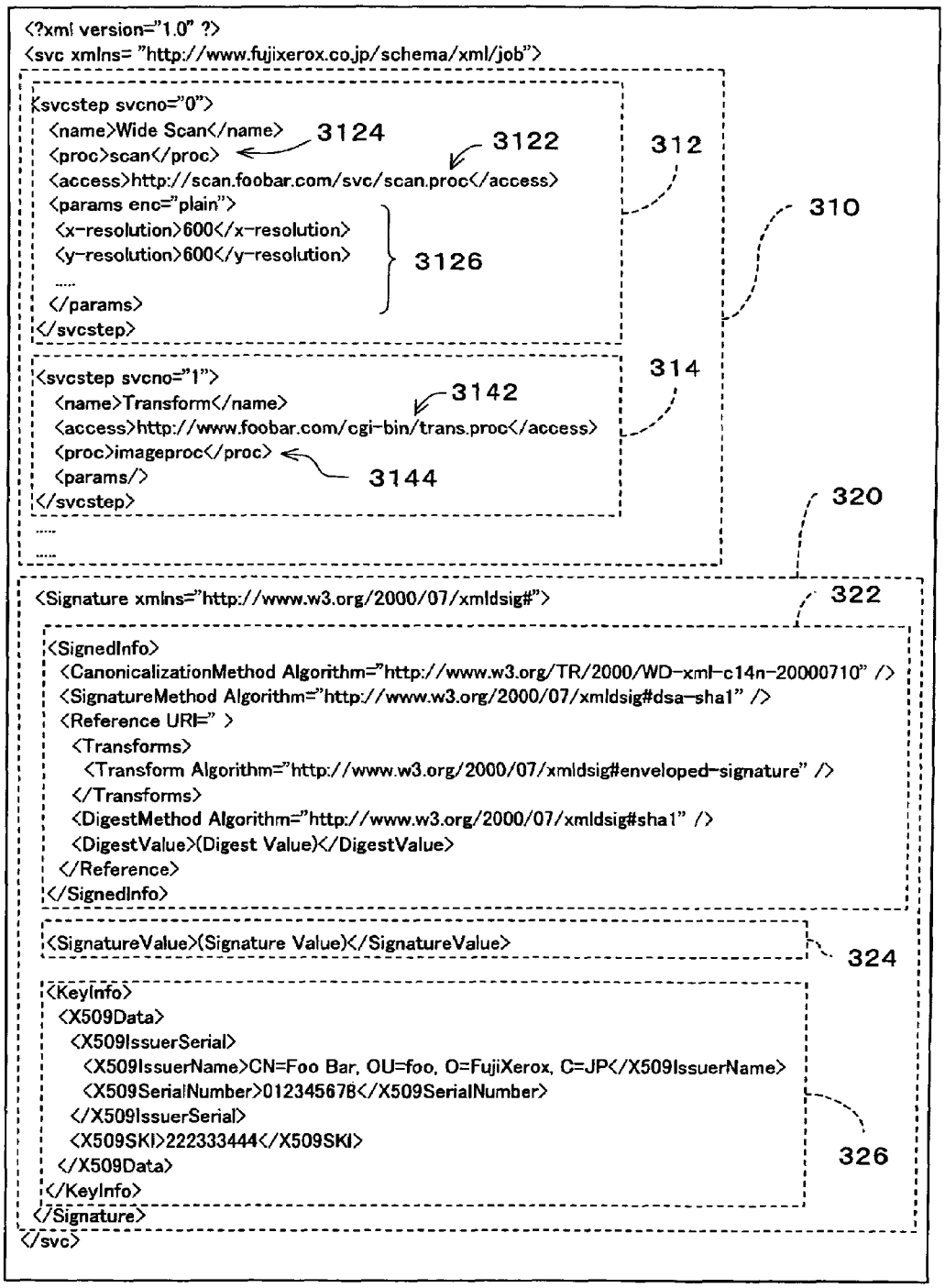
FIG. 3 is a diagram showing an example of description of a job flow instruction to which an electronic signature is attached.

FIG. 3 shows an example job flow instruction written based on an XML-signature (extensible Markup Language—signature; RFC3275). The job flow instruction contains a process content element 310 describing the content of the process of the server 20 and a signature element 320 describing information of electronic signature corresponding to the process content element 310.

The process content element 310 contains individual instructions 312 and 314 directed to servers 20. The individual instructions 312 and 314 respectively contain service names 3122 and 3142 indicating the destination of the instruction, process names 3124 and 3144 indicating the type of process the destination service is to execute, and parameters 3126 for the process to be executed.

The signature element 320 contains a signature information element 322 indicating data such as the algorithm used for the electronic signature of the job flow instruction 30 and a hash value of the target element of the signature (in this case, the process content element 310), a signature value element 324 indicating a signature value determined from the signature target element using the algorithm, and a key information element 326 describing information for specifying a public key to be used for verification of the electronic signature. The key information element 326 contains information necessary for specifying the public key certificate corresponding to the secret key used for calculation of the value of the electronic signature. The XML-signature standards noted above can be referred to for details of each element within the signature element 320.

The instruction division/integration unit 204 divides a job flow instruction 30 received from the previous sever 20 and having a structure as described into the process content element 310 and the signature element 320. The instruction division/integration unit 204 further divides the signature element 320 into a segment containing the signature information element 322 and the signature value element 324 and a segment containing the key information element 326. After these division steps, the process content element 310 is sent to an instruction processor unit 212 and to a signature verification unit 210, the key information element 326 is sent to a verification key selection unit 208, and the signature information element 322 and the signature value element 324 are sent to the signature verification unit 210.

A key storage unit 206 stores the secret key of the server 20 which is used for electronically signing the job flow instruction 30 to be sent to the next server, etc., and public keys of other servers 20 used for verification of signatures on the received job flow instructions 30. In the present embodiment, the key storage unit 206 stores, as the secret keys to be used for signing, an in-house secret key certified by the in-house CA and an external secret key certified by a public CA. These two secret keys may have the same value, but the corresponding public key certificates differ from each other in that one is for internal use and the other is for external use.

The verification key selection unit 208 obtains, from the key storage unit 206, a public key indicated in the information of the key information element 326 sent from the instruction division/integration unit 204 and sends the public key to the signature verification unit 210.

The signature verification unit 210 verifies the electronic signature attached to the job flow instruction 30 using the process content element 310, the signature information element 322 and the signature value element 324 received from the instruction division/integration unit 204, and a public key received from the verification key selection unit 208. In this verification process, the signature value indicated in the signature value element 324 is decoded using the public key received from the verification key selection section 208 (in this step, the algorithm shown in the signature information element 322 is used), and a hash value of the process content element 310 is calculated. When the result of the decoding matches the calculated hash value, the signature verification unit 210 determines that verification is successful. When, on the other hand, the verification fails, there is a possibility that the process content element 310 and/or the signature element 320 is falsified, and, thus, the server 20 executes a predetermined error process.

An instruction processor unit 212 is a unit for executing a process for the job flow instruction 30. When verification by the signature verification unit 210 is successful, the instruction processor unit 212 identifies an individual instruction 32 directed to its own device from the job flow instruction 30 and executes the process indicted in the individual instruction 32. For example, when an individual instruction 32, within the job flow instruction 30, directed to the server 20 indicates an execution instruction of resolution conversion to image data, the server 20 applies the indicated resolution conversion process to the image data received along with the job flow instruction 30; this image data is the processing target of the process corresponding to the instruction.

In a configuration in which each server 20 deletes the individual instruction 32 directed to this server 20 upon completion of the process and transmits the job flow instruction 30 to the next server 20 as shown in FIG. 1, the individual instruction 32 at the leading end of the received job flow instruction 30 is the individual instruction directed to the server. In addition to this configuration, it is also possible to identify the individual instruction directed to the receiving server, for example, by referring to the description 3122 of the service name.

When verification fails in the signature verification unit 210, the instruction processor unit 212 terminates the process to the job flow instruction 30 because there is a possibility that the process content element 310 and/or the signature element 320 is falsified, and executes a predetermined error process.

When the signature verification is successful and the instruction processor unit 212 applies the process, an instruction creation unit 214 removes the individual instruction 32 directed to the server from the job flow instruction 30 received from the previous server 20 and creates a process content element 310 of a job flow instruction directed to the next server 20 (this instruction is hereinafter referred to as "output job flow instruction"). In some cases, the parameters of the processes in the next server 20 or in the subsequent servers 20 may be determined based on the process of the server 20. In these cases, parameters determined as the result of the process are written to the process content element 130 of the output job flow instruction.

A signature key selection unit 216 selects a signature key to be used for electronic signing of the process content element 310 of the output job flow instruction. As described earlier, the key storage unit 206 stores two signature keys (secret keys) of the server 20, one for use inside the company and the other for external use, and the signature key selection unit 216 selects the secret key to be used from these two types of keys. In this selection, it is judged whether the server 20 which is the destination of the output job flow instruction is within or outside the company, and, based on this judgment, the signature key selection unit 216 selects either an in-house signature key if the destination server 20 is within the company, or an external signature key if the destination server 20 is external to the company. The judgment as to whether the destination server 20 is within or outside the company is based on the URL indicated in the service name of the individual instruction 314 to the destination server 20. This judgment based on the URL can be accomplished by, for example, inquiring and obtaining from a predetermined name server the IP address corresponding to the URL of the service name and then judging whether the server is within or outside the company based on the obtained IP address. The signature key selection unit 216 reads the selected signature key from the key storage unit 206 and sends the selected signature key to a signature creation unit 218.

The signature creation unit 218 creates an electronic signature for the process content element 310 received from the instruction creation unit 214 using the signature key obtained from the signature key selection unit 216. In the signature creation process, a hash value of the process content element 310 is calculated and a signature value is calculated by applying the signature key to the hash value. Then, the signature creation unit 218 creates a signature information element 322 describing the algorithm used for calculation of the signature value, a signature value element 324 containing the signature value, and a key information element 326 indicating the public key certificate corresponding to the used signature key, and sends these elements to the instruction division/integration unit 204.

The instruction division/integration unit 204 adds the signature information element 322, the signature value element 324, and the key information element 326 created by the signature creation unit 218 to the process content element 310 created by the instruction creation unit 214 to create an output job flow instruction. The created output job flow instruction is transmitted to the destination server 20 via the network I/F unit 202.

As described, in the configuration of this embodiment, a server 20 which executes a partial process within the cooperative service judges whether the server 20 to execute the next process is within or outside the company and attaches an electronic signature which can be verified using a public key certificate issued by a public CA when the next server 20 is outside. Thus, when an outside server 20 receives a job flow instruction from an in-house server 20, the outside server 20 can verify the signature by obtaining a public key certificate of the in-house server 20 from a public CA. At the same time, it is possible to prevent leakage of in-house information such as, for example, organizational structure information contained in the public key certificate from the in-house CA.

On the other hand, in the present embodiment, when the next server 20 to execute a process is a server within the company, the server 20 attaches an electronic signature that can be verified using a public key certificate from the in-house CA to the job flow instruction. Because of this, the next server 20, which is within the company, can easily verify the signature without the necessity to obtain a public key certificate from a public CA on the Internet.

In the above embodiment, the signature key is selected based on whether the next server is an internal or external server. This configuration is only one example, and the selection of the signature keys may, in another example, be realized based on whether or not the next server belongs to a particular division within the same company.

Moreover, in the above embodiment, an electronic signature to be applied to a job flow instruction 30 has been described. It is also possible, using a similar mechanism, to apply an electronic signature corresponding to the destination for data to be transmitted along with the job flow instruction (for example, target data for a process in the next device).

Figure 4:
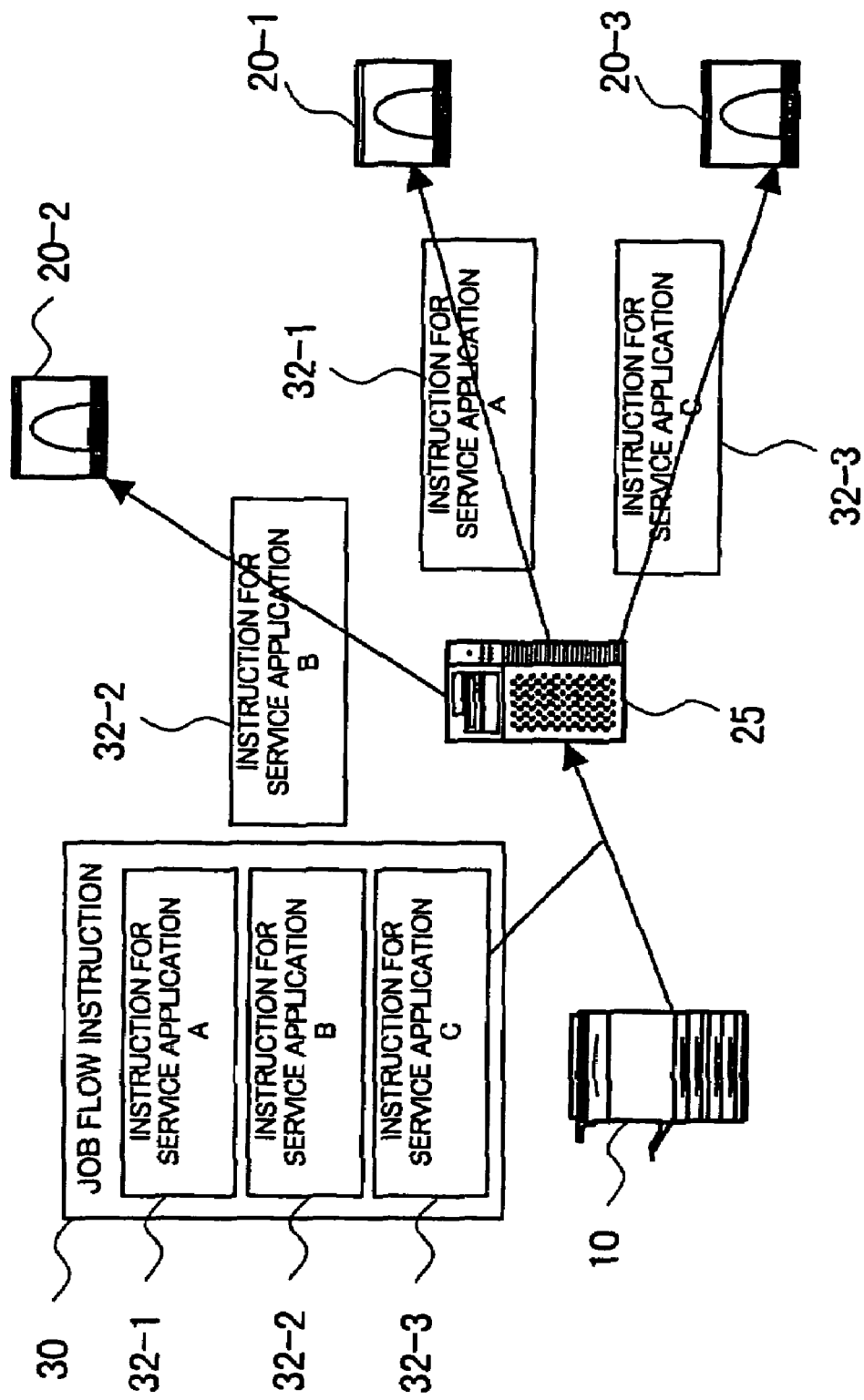
FIG. 4 is an explanatory diagram showing another example structure of a system for realizing a cooperative service.

The above-described electronic signature system can also be applied to a system having a structure as shown in FIG. 4.

A system shown in FIG. 4 includes a job flow controller 25 in addition to the instruction input device 10 and the servers 20. The job flow controller 25 is a device that controls execution of processes in the servers 20 in this system. More specifically, the job flow controller 25 receives a job flow instruction 30 created by the instruction input device 10, extracts individual instructions 32 for servers 20 from the job flow instruction 30, and transmits the individual instructions 32 to the corresponding server 20 according to the order of the processes. Each of the servers 20 receives the individual instruction 32, executes the process according to the received individual instruction 32, and returns the data of the processing result to the job flow controller 25 when the process is completed. The job flow controller 25 receives this data and transmits the individual instruction 32 to the next server 20. These steps are repeated so that one service flow can be realized by the cooperation of a plurality of servers 20.

In this embodiment, the job flow controller 25 is connected to an internal network within the same company as the instruction input device 10.

In a system as shown in FIG. 4 as described, the job flow controller 25 has a signature key certified by an in-house public key certificate and a signature key certified by an outside public key certificate. The job flow controller 25 verifies the electronic signature attached to a job flow instruction 30 received from the instruction input device 10. When the job flow controller 25 judges that the signature is a valid signature by the instruction input device 10, the job flow controller 25 extracts, from the process content element 310 of the job flow instruction 30, individual instructions 32 (312, 314, etc.) directed to the servers 20 and transmits the individual instruction in order. When transmitting the instruction, the job flow controller 25 judges whether the destination server 20 of the individual instruction 32 is a device directly connected to the internal network or one located outside the company, and attaches an electronic signature to the individual instruction 32 using a signature key corresponding to the in-house certificate if the destination server 20 is on the intranet, or using a signature key corresponding to an outside certificate if the destination server 20 is outside. With this configuration, it is possible to smoothly verify the signature regardless of whether the server 20 receiving the individual instruction 32 is part of, or external to, the company intranet.

Similar to the configuration described above, with this configuration, the electronic signature of the in-house instruction input device 10 contained in the job flow instruction 30 from the instruction input device 10 is not transmitted to an outside server 20.

In the system described above, individual server 20 judges whether the server 20 to which the job flow instruction 30 is next to be transmitted is internal or external to the company, and attaches an electronic signature using a signature key corresponding to the judgment. This configuration, however, is only an example of the present invention, and an alternative example such as, for example, the configuration which will be described below may be employed.

Specifically, in the example used to illustrate the above embodiment, each server 20 creates a job flow instruction 30 to be sent to the next server 20 and attaches an electronic signature of its own device. In another embodiment, a job flow instruction created and electronically signed by the instruction input device 10 is transmitted from a server 20 to the next server 20. In this configuration, attention is given to whether the instruction input device 10 uses a signature key corresponding to an in-house public key certificate or an external public key certificate for electronically signing the job flow instruction. In consideration of this point, the instruction input device 10 in this embodiment judges whether each of the servers 20 to be used for the cooperative service requested by the user is a device internal or external to the company. When the servers 20 include at least one external device, the instruction input device 10 attaches a signature to the job flow instruction using an outside signature key. Conversely, when all servers 20 used for the cooperative service are within the company, the instruction input device 10 electronically signs using an in-house signature key.

Figure 5:
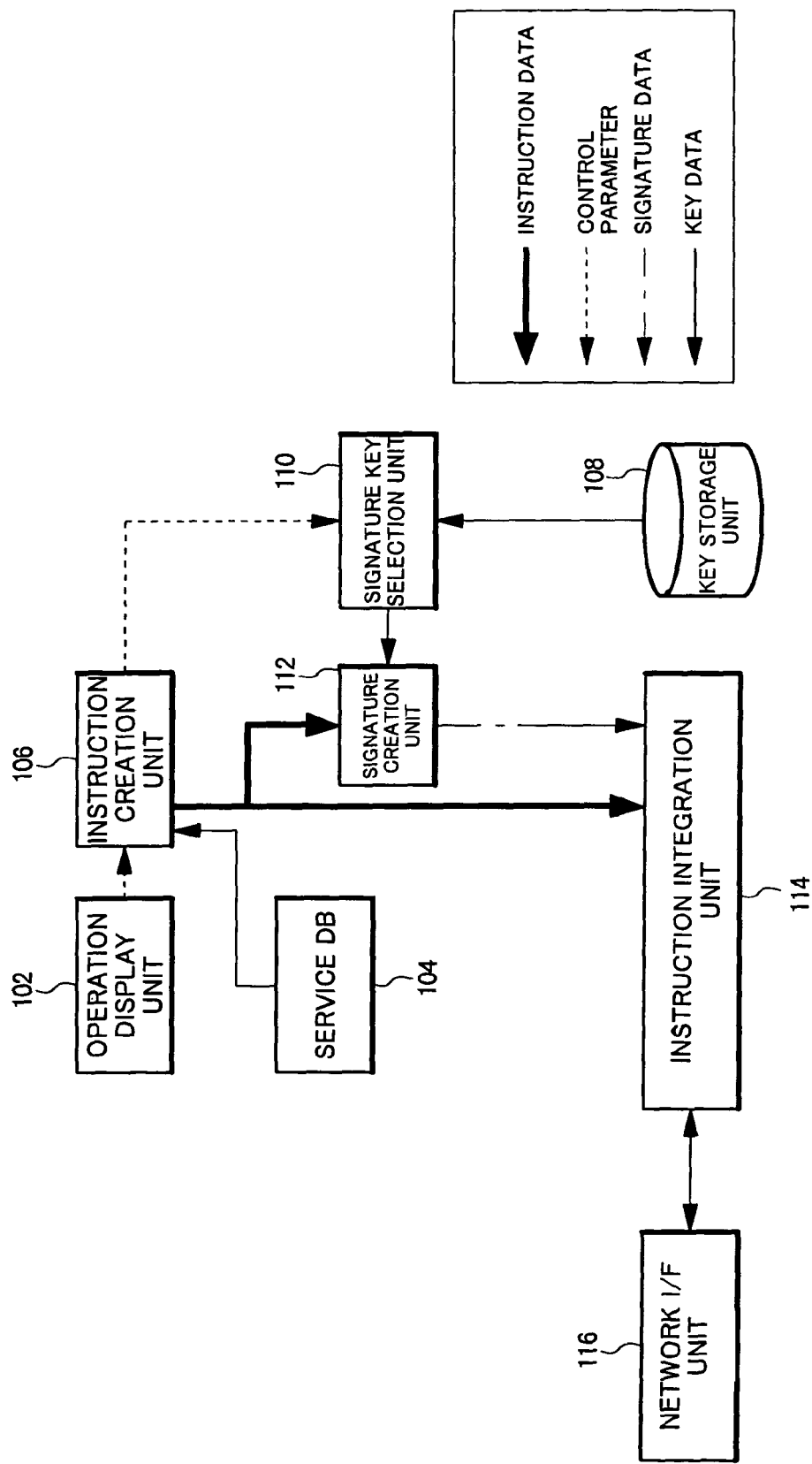
FIG. 5 is an explanatory diagram showing a structure of an instruction input device in an alternative embodiment of the present invention.

FIG. 5 is a functional block diagram showing a structure of an instruction input device 10 according to this embodiment. In this structure, an operation display unit 102 is a unit which displays a user interface through use of which a user can input an instruction which is received by the operation display unit 102. An execution instruction of a cooperative service from the user is input from the operation display unit 102. In order to allow input of execution instruction, for example, the operation display unit 102 displays a list of names of selectable cooperative services, allows the user to select a desired service, and, when appropriate, permits the user to input processing parameters. An example of a processing parameter could be, for example, a mail destination address for a server providing an electronic mail transmission service. A service DB (database) 104 contains templates of job flow instructions 30 corresponding to the cooperative services, the templates being correlated to the name of the cooperative services. This template is a template of a portion, in the signed job flow instruction of FIG. 3, corresponding to the process content element 310. The process content element 310 contains information for specifying the server 20 to be used such as, for example, the service name 3122 and 3142.

An instruction creation unit 106 receives the user's selection of the cooperative service and the corresponding parameters from the operation display unit 102, obtains a template of the job flow instruction corresponding to the selected cooperative service from the service DB 104, and completes a process content element 310 of the job flow instruction by substituting the received parameters into the template. The created process content element 310 is provided to an instruction integration unit 114 and a signature creation unit 112. In addition, the instruction creation unit 106 sends information on the service names 3122 and 3142 of the servers 20 contained in the process content element 310 to a signature key selection unit 110.

A key storage unit 108 stores two types of keys for electronic signature to the job flow instruction 30, one corresponding to a public key certificate issued by an in-house CA and the other corresponding to a public key certificate issued by a public CA.

Based on the information of the servers 20 used in the cooperative service provided from the instruction creation unit 106, the signature key selection unit 110 judges whether or not there any of the servers 20 are outside the company. When the signature key selection unit 110 judges that there is at least one outside server 20, the signature key selection unit 110 selects an outside signature key and when the signature key selection unit 110 judges that there is no outside server 20, the signature key selection unit 110 selects an in-house signature key. The signature key selection unit 110 retrieves the selected signature key from the key storage unit 108 and sends the key to the signature creation unit 112.

The signature creation unit 112 creates a signature information element 322, a signature value element 324, and a key information element 326 in a manner similar to the above using the process content element 310 received from the instruction creation unit 106 and the signature key received from the signature key selection unit 110, and sends the created elements to the instruction integration unit 114.

The instruction integration unit 114 creates an output job flow instruction by adding the signature information element 322, signature value element 324, and key information element 326 created by the signature creation unit 112 to the process content element 310 created by the instruction creation unit 106. The created output job flow instruction is transmitted to a first server 20 in the cooperative service via a network I/F unit 102.

From thereon, each of the servers 20 verifies the electronic signature of the instruction input device 10 in the received job flow instruction 30, and, when the verification is successful, the server 20 identifies an individual instruction 32 directed to itself from the instruction 30, executes the process indicated in the individual instruction 32, and transmits the received job flow instruction 30 to the next server 20 without any change.

Figure 6:
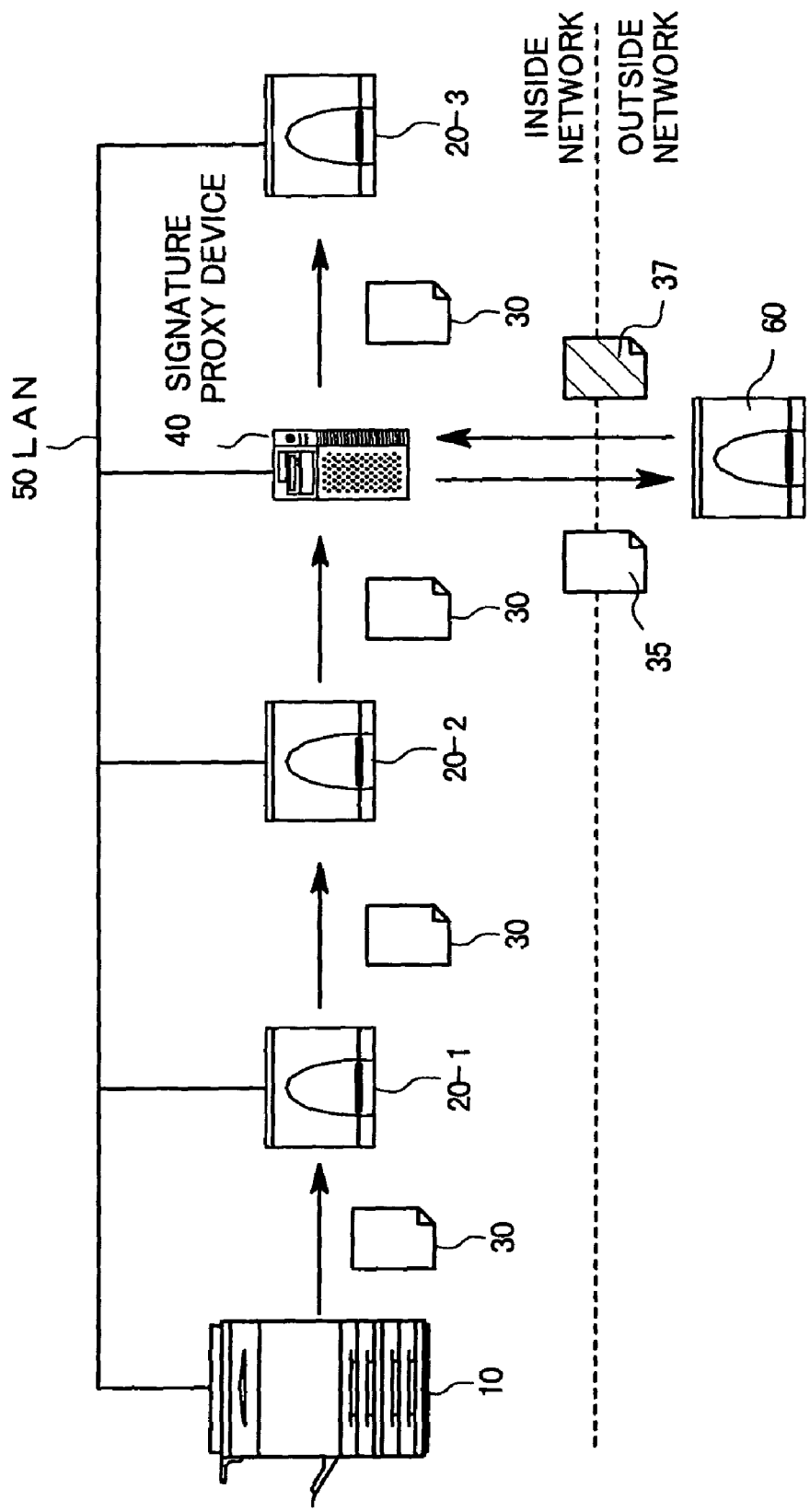
FIG. 6 is an explanatory diagram showing a system structure of an alternative embodiment of the present invention.

Next, another alternative embodiment will be described. In this embodiment, as shown in FIG. 6, a signature proxy device 40 is provided on a LAN 50 (or intranet) within the company, to which the instruction input device 10 and the servers 20 are connected. The signature proxy device 40 is certified with public key certificates from an in-house CA and from a public CA. In this description, it is assumed that an application server 60 is present outside the company (outside the intranet).

In this system, the instruction input device 10 and the servers 20 on the in-house LAN 50 need only have a secret key corresponding to a public key certificate issued by the in-house CA. The instruction input device 10 and the server 20 electronically signs the job flow instruction 30 to be sent to the next server 20 using the in-house secret key. The process in the server 20 is similar to those of the server 20 in the embodiment shown in FIG. 2 except that there is no selection of the key to be used for signing (that is, the in-house signature key is always used).

In the instruction input device 10 and the server 20 within the company, an IP address and name of the signature proxy device 40 are set as a proxy server to be used when the instruction input device 10 or the server 20 is to transmit the job flow instruction 30 to outside the intranet. When sending a signed job flow instruction to the next server 20, the instruction input device 10 and the servers 20 judge whether the destination server is within or outside the company, and, when the destination server is within the company, the instruction input device 10 or the server 20 directly transmits the signed instruction 30 to the destination server, and, when the destination server is outside the company, the instruction input device 10 or the server 20 transmits the signed instruction 30 to the signature proxy device 40. In the embodiment shown in FIG. 6, the server 20-2 judges that the next server 60 is an outside device and sends the signed job flow instruction 30 to the signature proxy server 40.

The signature proxy device 40 receiving this job flow instruction 30 verifies the signature of the job flow instruction 30, and, when the verification is successful, the signature proxy device 40 deletes the signature element 320 of the electronic signature of the server 20-2 (which uses the in-house signature key) from the job flow instruction 30, creates a job flow instruction 35 by attaching an electronic signature to the process content element 310 appearing as a result of the deletion of the signature element 320 using a secret key corresponding to an outside public key certificate of the signature proxy device 40, and transmits the job flow instruction 35 to the outside destination server 60.

An in-house server 20 does not directly receive a job flow instruction from an outside server 60. A job flow instruction 37 directed to an in-house server 20-3 from an outside server 60 is first received by the signature proxy device 40. The signature proxy server 40 verifies the electronic signature attached to the job flow instruction 37, and, when the verification is successful, the signature proxy device 40 deletes the signature element 320 of the electronic signature of the outside server 60 from the job flow instruction 37, creates an in-house job flow instruction 30 by attaching an electronic signature to the process content element 310 appearing as a result of the deletion of the signature element using a secret key corresponding to an in-house public key certificate of the signature proxy device 40, and transmits the in-house job flow instruction 30 to the destination server 20-3.

In this manner, the signature proxy device 40 replaces electronic signatures attached to instructions communicated from inside to outside the company, and instructions communicated to the inside of the company from outside. With this replacement process, the instruction input device 10 and servers 20 within the company are only required to be certified with a public key certificate from the in-house CA and to electronically sign the instruction using the in-house signature key regardless of whether the destination is internal or external to the company. When the instruction is to be sent outside, the signature proxy server 40 replaces the signature with a signature for outside use. In this manner, it is possible to detect any falsification or the like of the job flow instruction 30 between the in-house servers 20 and, at the same time, detect any falsification or the like of the job flow instructions between the inside and outside of the company. In addition, because the outside server 60 can verify the signature on the instruction 35 by merely obtaining an outside public key certificate of the signature proxy device 40 from the public CA, verification of a signature is a simple task.

In addition, in this system, the signature of the signed instruction 37 from the outside server 60 is verified by the signature proxy device 40, and, when the verification is successful, the electronic signature on the job flow instruction 37 is replaced with an in-house electronic signature of the signature proxy device 40 and the job flow instruction 37 is sent to the destination in-house server 20-3. Therefore, according to this configuration, the servers 20 within the company is only required to have a capability to verify signature using a public key certificate issued by the in-house CA, and there is no need for the in-house server 20 to be compatible with the public key certificate of an outside CA.

Figure 7:
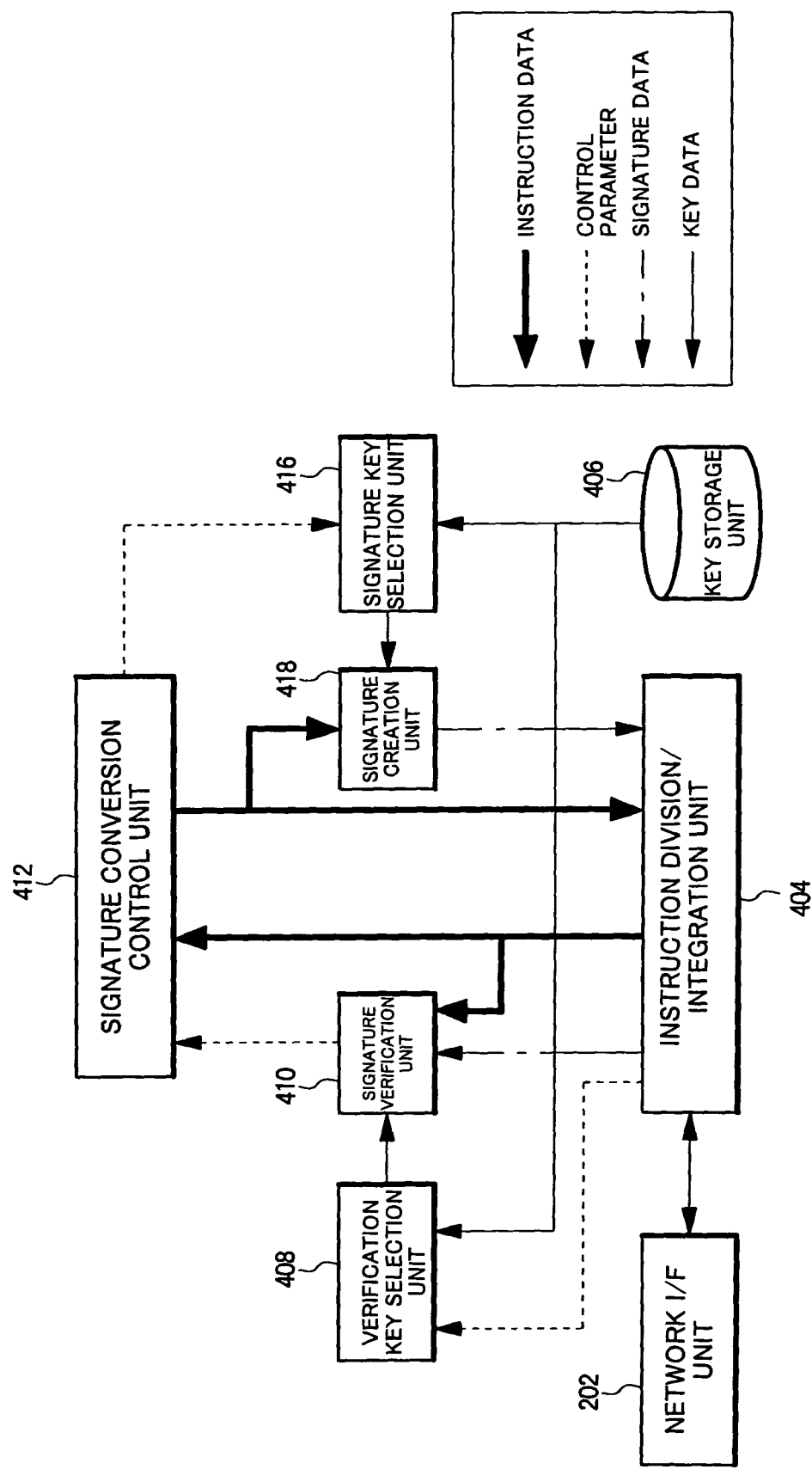
FIG. 7 is an explanatory diagram showing a structure of a signature proxy device in the alternative embodiment of the present invention shown in FIG. 6.

An example structure of the signature proxy device 40 will now be described referring to FIG. 7.

In this device 40, an instruction division/integration unit 404, upon reception of a job flow instruction 30 via a network I/F unit 402, provides a process content element 310 extracted from the job flow instruction 30 to a signature verification unit 410 and a signature conversion controller unit 412, a signature information element 322 and a signature value element 324 (refer to FIG. 3) extracted from the job flow instruction 30 to a signature verification unit 410, and a key information element 326 extracted from the job flow instruction 30 to a verification key selection unit 408. The verification key selection unit 408 retrieves a public key indicated in the key information element 326 from a key storage unit 406 and sends the selected public key to the signature verification unit 410. The signature verification unit 410 executes a signature verification process similar to that in the embodiment shown in FIG. 2 using the public key. The result of this verification (successful or failure) is sent to the signature conversion controller unit 412.

The signature conversion controller unit 412 instructs the signature key selection unit 416 to replace the signature on the job flow instruction 30 with an outside signature when the job flow instruction 30 is from a server 20 within the company. On the other hand, when the job flow instruction 30 is from an outside server 60, the signature conversion controller unit 412 instructs the signature key selection unit 416 to replace the signature on the job flow instruction 30 with an in-house signature. The judgment on whether the job flow instruction 30 is from a server 20 within the company or from an outside server 60 can be done by checking whether the public key used for the signature verification in the signature verification unit 410 is certified by an in-house CA or by an outside CA. Alternatively, the judgment can be made by the signature conversion controller unit 412 receiving information on the originating URL and IP address of the job flow instruction 30 from the network I/F unit 402 and deciding accordingly.

In the above example, it is described that only instructions from the inside to the outside of the company or the instructions from the outside to the inside of the company are received by the signature proxy device 40. When, however, there is a possibility that an instruction from an in-house server 20 to another transmits through the signature proxy device 40, the signature proxy server 40 reviews not only the origin, but also the destination. Specifically, the signature conversion controller unit 412 judges that the signature should be replaced for instructions from the inside to the outside of the company and for instructions from the outside to the inside of the company and that the signature should not be replaced for instructions between devices within the company. The destination of the job flow instruction 30 can be determined from the URL indicated in the service name 3122 of the individual instruction at the leading end of the process content element 310 of the job flow instruction 30 or from the destination IP address received from the network I/F unit 402.

The signature key selection unit 416 selects a signature key (in-house or external) of the proxy device 40 corresponding to the instruction from the signature key conversion controller unit 412 from the key storage unit 406 and sends the selected key to a signature creation unit 418. The signature creation unit 418 calculates a value for an electronic signature corresponding to the process content element 310 using the sent signature key and sends a signature information element 322, a signature value element 324, and a signature information element 326 indicating the electronic signature to the instruction division/integration unit 404. The instruction division/integration unit 404 re-constructs a job flow instruction by combining the received elements 322, 324, and 326 into the received process content element 310 and transmits the created job flow instruction to the destination server via the network I/F unit 402.

When the signature conversion controller unit 412 judges that there is no need for replacement of a signature (for example, when the instruction is from an in-house device to another), this judgment is sent to the instruction division/integration unit 404. The instruction division/integration unit 404 receiving this information transmits the job flow instruction 30 received from the network I/F unit 402 to the destination server without any change.

In the above examples, the in-house server 20 uses only a signature key corresponding to a public key certificate certified by the in-house CA. There are, however, situations wherein the in-house server 20 is also certified by a public key certificate from an outside CA. In such a case, the signature proxy device 40 verifies the signature of a job flow instruction from the in-house server 20 to an outside server 60 and judges whether the signature attached to the instruction corresponds to the in-house or outside certificate. When the signature proxy device 40 judges that the signature corresponds to an in-house CA, the signature proxy device

40 replaces the signature, and when the signature proxy device 40 judges that the signature corresponds to an outside CA, the signature proxy device 40 skips the replacement step.

In the embodiment described with reference to FIGS. 6 and 7, each server 20 within the company judges whether the destination of the job flow instruction 30 is inside or outside of the company and sends the job flow instruction 30 to the signature proxy device 40 when the destination is outside. Alternatively, it is also possible to employ a configuration wherein the in-house server 20 does not perform such judgment. In such a case, a signature proxy server 40 is provided as a gateway on the boundary between the in-house LAN 50 and the Internet and monitors the job flow instruction 30 which is to be sent from the in-house LAN 50 to the Internet. The signature proxy device 40 verifies the electronic signature of a job flow instruction 30 which is found through the monitoring, and, when it is determined that the signature was created using a secret key corresponding to an in-house public key certificate, the signature proxy device 40 applies the signature replacement process as described above and transmits the job flow instruction 30 to the destination server on the Internet. The signature proxy device 40 also monitors the job flow instructions which is to be sent into the in-house LAN 50 from the Internet, and, when the job flow instruction is signed using a secret key corresponding to an outside public key certificate, performs the signature replacement process as described above. With this configuration, advantages similar to the embodiment shown in FIGS. 6 and 7 can be obtained.

It is also possible for the signature proxy device 40 to be one of the application servers 20, include a description of the process content of the signature proxy device 40 in the job flow instruction 30, and for the signature proxy device 40 to perform the signature replacement process as described above according to the description of the process content.

In the above-described embodiments, the judgment as to whether the destination device to which the job flow instruction is to be transmitted next is internal or external to the company is made based on the URL of the destination device described in the job flow instruction. Alternatively, it is also possible to base this judgment on an IP address, a FQDN (Fully Qualified Domain Name), an e-mail address, or any other appropriate information associated with the destination device. The IP address, FQDN, and the electronic mail address of the destination device may be explicitly described in the job flow instruction or may be described in a packet header when the instruction is transmitted in the form of packets. In either case, the server 20 and the job flow controller 25 can obtain destination information suitable in each case and can judge whether the destination is inside or outside the company from the obtained information.

Although specific embodiments of the invention have been described, it will be understood by those having skill in the art that changes can be made to these specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A job processor for executing a service in cooperation with other job processors according to job flow instruction data, the job processor comprising:

a key storage unit having separate signature keys, one for use inside of a network to which the job processor belongs and the other for use outside of the network;

a receiver unit for receiving job flow instruction data which indicates a process instruction for each job processor and a next job processor for each job process;

a signature verification unit for verifying an electronic signature attached to the job flow instruction data received at the receiver unit;

a processor unit for identifying, from the job flow instruction data, a process instruction the job processor should execute when the verification by the signature verification unit is successful and for executing the process according to the process instruction;

an instruction data creation unit for creating output job flow instruction data to be transmitted to a next job processor based on the received job flow instruction data when the process is executed by the processor unit;

a judging unit for judging whether or not the next job processor is a device within the network;

a signature processor unit for electronically signing the output job flow instruction data using the signature key for the inside when the next job processor is a device within the network and using the signature key for the outside otherwise; and a transmitter unit for transmitting the output job flow instruction data electronically signed by the signature processor unit to the next job processor.

2. A job processor according to claim 1, wherein the judging unit judges whether or not the next job processor is a device within the network based on positional information of the next job processor on the internet indicated in the job flow instruction data.

3. A method for processing job flow instruction data in a job processor for executing a service in cooperation with other job processors according to the job flow instruction data, the method comprising the steps of:

receiving job flow instruction data which indicates a process instruction for each job processor and a next job processor for each job process;

verifying an electronic signature attached to the received job flow instruction data;

identifying a process instruction which should be executed by the job processor from the job flow instruction data when verification is successful;

executing a process according to the identified process instruction;

creating, when the process instruction is executed, output job flow instruction data to be transmitted to the next job processor based on the received job flow instruction data;

judging whether or not the next job processor is a device within the network;

electronically signing the output job flow instruction data using a signature key for the inside of the network to which the job processor belongs when the next job processor is a device within the network and a signature key for outside the network otherwise; and transmitting the electronically signed output job flow instruction data to the next job processor.

4. An instruction data creating device for creating job flow instruction data which indicates a process instruction for each job processor and a next job processor for each job process for a system for realizing a service by sequentially sending the job flow instruction data among the job processors and each job processor sequentially executing the process instruction for the job processor, the device comprising:

a key storage unit having a signature key for inside the network to which the instruction data creating device belongs and a signature key for outside the network;

a judgment unit for judging whether or not a job processor outside the network exists among the job processors for the service;

a signature processor unit for electronically signing the job flow instruction data using the signature for outside the network when the judgment unit judges that there is a device which is outside the network in the job processors for the service and using the signature for the inside otherwise; and a transmitter unit for transmitting the job flow instruction data electronically signed by the signature processor unit to a first job processor among the job processors for the service.

5. An instruction data creating device according to claim 4, wherein the judgment unit judges whether or not the next job processor is within the network based on positional information of the next job processor on the Internet indicated in the job flow instruction data.

6. A method in which a computer system creates job flow instruction data which indicates a process instruction for each job processor and a next job processor for each job processor for a system for realizing a service by sequentially sending the job flow instruction data among the job processors and each of the job processors sequentially executing the process instruction for the job processor, the method comprising the steps of:

judging whether or not a job processor outside a network to which the computer system belongs exists among the job processors for the service;

electronically signing the job flow instruction data using a signature key for the outside of the network when it is judged that there is a device which is outside the network in the job processors for the service and a signature key for the inside the network otherwise; and transmitting the electronically signed job flow instruction data to a first job processor of the job processors for the service.

* * * * *